United States Patent [19]

Takahashi et al.

[11] Patent Number: 4,758,468

[45] Date of Patent: * Jul. 19, 1988

[54] MAGNETIC RECORDING MEDIUM

[75] Inventors: Masatoshi Takahashi; Katsumi Ryoke; Nobuyoshi Asada; Eiichi Tadokoro, all of Kanagawa, Japan

[73] Assignee: Fuji Photo Film Co., Ltd., Kanagawa, Japan

[*] Notice: The portion of the term of this patent subsequent to Apr. 15, 2003 has been disclaimed.

[21] Appl. No.: 784,426

[22] Filed: Oct. 4, 1985

[30] Foreign Application Priority Data

Oct. 4, 1984 [JP] Japan ................... 59-208482

[51] Int. Cl.$^4$ .............................. G11B 5/70
[52] U.S. Cl. ..................... 428/323; 427/131; 428/408; 428/694; 428/900
[58] Field of Search ............... 428/694, 900, 323, 408; 427/131

[56] References Cited

U.S. PATENT DOCUMENTS

| | | | |
|---|---|---|---|
| 4,135,031 | 1/1979 | Akashi et al. | 428/900 |
| 4,452,863 | 6/1984 | Takizawa et al. | 428/694 |
| 4,474,843 | 10/1984 | Miyoshi et al. | 427/131 |
| 4,546,038 | 10/1985 | Yamaguchi et al. | 428/694 |
| 4,582,757 | 4/1986 | Miyoshi et al. | 428/694 |

*Primary Examiner*—Paul J. Thibodeau
*Attorney, Agent, or Firm*—Sughrue, Mion, Zinn, Macpeak and Seas

[57] ABSTRACT

The present invention relates to a magnetic recording medium which comprises a non-magnetic support having coated on opposite surfaces thereof a magnetic layer and a backing layer comprising a resin as a binder and non-magnetic particles, wherein the resin binder contains a polyurethane resin, a copolymer of vinylidene chloride and acrylonitrile, and a polyisocyanate compound; the non-magnetic particles contains fine carbon black having an average particle size of 30 to 150 mµ and coarse carbon black having an average particle size of 160 to 600 mµ; and the mixing weight ratio of the resin binder to the non-magnetic particles is within the range of 0.375:1 to 1:1 by weight. This magnetic recording medium has excellent electromagnetic properties and running durability.

10 Claims, No Drawings

MAGNETIC RECORDING MEDIUM

FIELD OF THE INVENTION

The present invention relates to a magnetic recording medium and more particularly it relates to a magnetic recording medium comprising a support having coated on opposite surfaces thereof a magnetic layer and a backing layer and having excellent electromagnetic properties and running durability.

BACKGROUND OF THE INVENTION

A magnetic recording medium used for audio recording, video recording or for computers has recently been required to be highly sensitive. The magnetic recording medium can be made highly sensitive by improving recording systems of a deck for magnetic recording and replaying and a magnetic recording medium, as well as a magnetic recording medium itself, whereby a high quality image, a high quality sound and a high density recording can be realized.

A magnetic recording medium can be highly sensitive also by smoothing the surface of the magnetic recording medium. But the smoothing undesirably causes deterioration of running durability and properties of uniformly winding up tapes; increase of friction coefficient; and generation of wear of the magnetic layer and a backing layer thereof. As a result, drop out and output fluctuation increase.

The present inventors performed extensive research directed to developing a backing layer to remove the above defects and as a result it was found that remarkable improvements can be made by using a certain kind of a resin for a binder, two kinds of carbon black having a certain particle size and, if necessary, a talc in a certain mixing ratio in a backing layer. Thus, the present invention was obtained.

SUMMARY OF THE INVENTION

An object of the present invention is to provide a magnetic recording medium having a novel backing layer, whereby the friction coefficient is not increased and wear is not generated, thereby causing a decrease in drop out and having excellent S/N characteristics.

Another object of the present invention is to provide a magnetic recording medium having a backing layer with excellent running durability.

As a result of thorough research by the present inventors it was found that the above-described objects can be attained by the following present invention.

That is, the present invention provides a magnetic recording medium comprising a non-magnetic support having coated on opposite surfaces thereof a magnetic layer and a backing layer comprising a resin as a binder and non-magnetic particles, wherein the resin binder contains a polyurethane resin, a copolymer of vinylidene chloride and acrylonitrile, and a polyisocyanate compound; the non-magnetic particles contains fine carbon black having an average particle size of 30 to 150 m$\mu$ and coarse carbon black having an average particle size of 160 to 600 m$\mu$; the mixing ratio of the resin binder to the non-magnetic particles is within the range of 0.375:1 to 1:1 by weight. The non-magnetic particles can further contain talc.

DETAILED DESCRIPTION OF THE INVENTION

The present invention is further illustrated in more detail hereinafter.

Carbon black having an average particle size of 30 to 150 m$\mu$, preferably 60 to 120 m$\mu$ used for the backing layer of the present invention can reduce surface electric resistance of the backing layer and prevent adhesion of dust on the backing layer, which is a cause of drop out. The commercially available examples of such carbon black include "Asahi #60", "Asahi #55", "Asahi #50", "Asahi #35", "Asahi Thermal", trade names, prepared by Asahi Carbon Co., Ltd., "Raven 850", "Raven 500" and "Raven 450", trade names, manufactured by Columbia Carbon Co., Ltd., "Vulcan xc 72", a trade name, manufactured by Cabot Co., Ltd., "Nittelon #300", "Nittelon #200" and "Nittelon #10", trade names, manufactured by Nittetsu Kagaku Co., Ltd.

Carbon black having an average particle size of 160 to 600 m$\mu$, preferably 180 to 500 m$\mu$ used in the present invention not only has the function of a solid lubricating agent but also is capable of providing a smooth surface for the backing layer. The smooth surface has the proper roughness so that printing through to the magnetic layer nevers occurs when used in combination with the above-described carbon black having an average particle size of 30 to 150 m$\mu$, thereby remarkably increasing running durability. Commercially available examples of such carbon black includes "Raven MTP", a trade name, manufactured by Columbia Carbon Co., Ltd., and "Sevacarb MT", a trade name, manufactured by Sevalco Co., Ltd.

Talc used in the backing layer of the present invention has an average particle size of 0.1 to 50 $\mu$m, preferably 0.1 to 15 $\mu$m. Commerically available examples of such talc include "Micro. Ace K", "Micro. Ace G", "Micro. Ace L-1", and "Micro. Ace L-2", trade names, manufactured by Nippon Talc Co., Ltd., "Manshu Talc P", "TT Talc" and "NT Talc", trade names, manufactured by Takehara Kagaku Kogyo Co., Ltd.

The objects of the present invention can be accomplished by the use of the above described two kinds of carbon black, but the objects can be more favorably accomplished by the further addition of talc. Curling of the tape of the magnetic recording medium can be prevented and contact between a magnetic recording medium and a head for magnetic recording and replaying can be improved by the inclusion of talc. The reason of this phenomenon is not definitely known but it is considered to be that the flat shape of the talc prevents curling of the tape in a transverse direction thereof. Furthermore, talc also functions as a lubricating agent and can improve running properties of the tape.

The mixing ratio of the fine carbon black having an average particle size of 30 to 150 m$\mu$ to the coarse carbon black having an average particle size of 160 to 600 m$\mu$ is 20:80 to 90:10 by weight, preferably 40:60 to 80:20 by weight. If coarse carbon black is more than the above-described mixing ratio of 20:80 by weight, the surface electric resistance of the backing layer increases, thereby increasing dust adhesion and causing an increase in drop out. If the fine carbon black is more than the above-described mixing ratio of 90:10 by weight, the proper unevenness on the surface of the backing layer deteriorates and the running durability deteriorates.

When the talc is used in combination with the above two kinds of carbon black, the mixing ratio of the two types of carbon black to the talc is preferably 40:60 to 80:20 by weight and more preferably 50:50 to 70:30 by weight. Wen talc is included, the mixing ratio of the fine carbon black to the coarse carbon black can be negligible so long as the fine carbon black is used in an amount of 20 parts by weight or more per 100 parts by weight of all non-magnetic particles and the coarse carbon black is used in an amount of 10 parts by weight or more per 100 parts by weight of all non-magnetic carbon.

Polyurethane resins used in the backing layer of the present invention include a polyester polyurethane resin and a polyether polyurethane resin obtained by reacting a polyol such as (1) a polyester polyol, (2) a lactone type polyester polyol or (3) a polyether polyol with a diisocyanate compound such as an aromatic diisocyanate compound (e.g., tolylene diisocyanate, xylylene diisocyanate and 4,4′-diphenyl methane diisocyanate) or an aliphatic diisocyanate compound (e.g., hexamethylene diisocyanate), wherein (1) the polyester polyol is synthesized by the reaction of an organic dibasic acid (e.g., saturated or unsaturated dicarboxylic acid such as maleic acid or adipic acid, alicyclic dicarboxylic acid such as norbornane carboxylic acid and aromatic dicarboxylic acid such as phthalic acid) with two or more polyols optionally selected from the group consisting of glycols such as ethylene glycol, propylene glycol, diethylene glycol, or polyethylene glycol; polyhydric alcohols such as trimethylol propane, hexanetriol, glycerine or pentaerythritol; or polyhydric phenols such as hydroquinone or bisphenol A, (2) the lactone type polyester polyol is synthesized from lactones such as ε-caprolactone or γ-butylolactone and (3) the polyether polyol is synthesized from ethylene oxide, propylene oxide or butylene oxide. These polyurethane resins can have anad isocyanate group, a hydroxyl group or a carboxylic group or a mixture thereof at the terminals thereof and preferable example of the polyurethane resin is a reaction product of (1) the polyester polyol or (2) the lactone type polyester polyol, tolylene diisocyanate, and 4,4′-diphenylmethane diisocyanate. Such polyurethane resins have a molecular weight of 10,000 to 200,000. These polyurethane resins are commercially available under the trade names of "Nipporan N-2301", "Nipporan N-2304" and "Nipporan 2305", manufactured by Nippon Polyurethane Co., Ltd., "Pandex T-5000", "Pandex T-5180", "Pandex T-5102S", "Pandex T-5165", "Crisvon 6109", "Crisvon 7209", "Crisvon 4260" manufactured by Dainippon Ink and Chemicals, Inc., "Olester A-2903" and "Olester A-2940" manufactured by Mitsui Nisso Urethane Co., Ltd.

A copolymer of vinylidene chloride and acrylonitrile used for the backing layer of the present invention is Saran resin, a trade name, manufactured by Asahi-Dow Limited., which is commercially available under the trade names of "F-216", "F-242" and "F-310". Saran resin generally has the capacity of good coating and water resistance.

Instead of a copolymer of vinylidene chloride and acrylonitrile, the present inventors tried to use a phenoxy resin which has many hydroxyl groups in a molecule whereby excellent affinity with non-magnetic particles was achieved, but there were problems that running durability was worse, and that the backing layer thereof was peeled off at super calender treatment.

A polyisocyanate compound used for the backing layer of the present invention includes a reaction product of 3 moles of diisocyanate such as tolylene diisocyanate, xylylene diisocyanate or hexamethylene diisocyanate with 1 mole of trimethylol propane, a biuret adduct product of 3 moles of hexamethylene diisocyanate, an isocyanurate adduct compound of 3 moles of tolylene diisocyanate and 2 moles of hexamethylene diisocyanate, a polymer of diphenyl methane diisocyanate, and isophoron diisocyanate. Preferable examples thereof are tolylene diisocyanate and 4,4′-diphenylmethane diisocyanate.

These compounds are commercially available under trade names of "Coronate L", "Coronate HL", "Coronate 2030", "Millionate MR" and "Millionate MTL", manufactured by Nippon Polyurethane Co., Ltd., "Desmodur L", "Desmodur N", "Desmodur IL" and "Desmodur HL", manufactured by Sumitomo Bayer Urethane Co., Ltd., "Takenate D-102", "Takenate D-110N" and "Takenate D-202", manufactured by Takeda Chemical Industries, Ltd.

A polyisocyanate compound makes the coated layer a three dimensional network structure and increases durability and solvent resistance.

Regarding the resin as the binder used for the backing layer of the present invention, the mixing ratio of a polyurethane resin to a copolymer of vinylidene chloride and acrylonitrile is 30:70 to 60:40 by weight and more preferably 40:60 to 50:50 by weight. When the polyurethane resin is used in more than a ratio of 60:40, blooming occurs. When a copolymer of vinylidene chloride and acrylonitrile is used in more than a ratio of 40:60, softness of the coated layer deteriorates and running properties unfavorably deteriorate. The weight ratio of the total amount of the polyurethane resin and the copolymer of vinylidene chloride and acrylonitrile to the amount of the polyisocyanate compound is preferably 95:5 to 60:40 by weight, more preferably 80:20 to 70:30 by weight. When the polyisocyanate compound is present in a ratio less than 95:5 by weight, durability and resistance to solvents of the coated layer deteriorate. When the polyisocyanate compounde is present in a ratio of more than 60:40 by weight, the coated layer becomes unfavorably fragile.

The weight ratio of the total amount of resin binders to that of non-magnetic particles is preferably 0.375:1 to 1:1 by weight, more preferably 0.8:1 to 0.5:1 by weight, especially preferably 0.75:1 to 0.65:1 by weight. When the binder resins are used more than the ratio of 1:1, blooming occurs. When they are used less than the ratio of 0.375:1 by weight, adhesive force of the backing layer to the support becomes smaller. In both cases, running durability of the backing layer unfavorably deteriorates.

A dispersing agent, a lubricating agent, an abrasive agent and an antistatic agent can be added to the backing layer of the present invention.

The dispersing agent includes a fatty acid having 12 to 18 carbon atoms ($R_1COOH$, wherein $R_1$ is an alkyl group having 11 to 17 carbon atoms) such as caprylic acid, capric acid, lauric acid, myristic acid, palmitic acid, stearic acid, oleic acid, elaidic acid, linolic acid, linolenic acid, or stearolic acid; a metal soap comprised of an alkali metal (Li, Na, K and the like) or an alkaline earth metal (Mg, Ca, Ba, Cu, Pb and the like) and the above fatty acids; and lecithin. In addition to the above, higher alcohols having 12 or more carbon atoms and the sulfuric ester thereof can be used. Preferable examples of the dispersing agent are oleic acid, lauric acid and a metal soap comprised of Cu and oleic acid. The dispersing agents can be used in an amount of 0.05 to 20 parts by weight, preferably 0.05 to 1.0 parts by weight per 100 parts by weight of the binder.

Specific examples of the dispersing agents are disclosed in Japanese Patent Publication Nos. 28369/1964, 17945/1969, 15001/1973, U.S. Pat. Nos. 3,387,993 and 3,470,021.

The lubricating agent added to the backing layer of the present invention includes silicone oil (silicone oil having lower viscosity is preferred), graphite, molybdenum disulfide, tungsten disulfide, oleic amide, fatty acid esters comprises of monobasic fatty acid having 12 to 16 carbon atoms and monohydric alcohol having 3 to 12 carbon atoms, and fatty acid esters comprised of monobasic fatty acids having 17 or more carbon atoms and a monohydric alcohol whereby the total carbon atoms of the fatty acid ester is 21 to 23. Preferable examples of the lubricating agent are a silicone oil, oleic acid, lauric acid, myristic acid and oleic amide. The lubricating agent can be used in an amount of 0.2 to 20 parts by weight per 100 parts by weight of the binder. The detailed description of the lubricating agent is disclosed in Japanese Patent Publication No. 23889/1968, Japanese Patent Application Nos. 28647/1967 and 81543/1968, U.S. Pat. Nos. 3,470,021, 3,492,235, 3,497,411, 3,523,086, 3,625,760, 3,630,772, 3,634,253, 3,642,539 and 3,687,725; *IBM Technical Disclosure Bulletin Vol.* 9, No. 7, Page 779 (Dec. 1966); *ELECTRONIX,* No. 12, page 380 (1961), etc.

An abrasive agent added to the backing layer includes a commonly used abrasive agent such as fused alumina, silicon carbide, chromium oxide, corundum, artificial corundum, diamond, artificial diamond, garnet or emery (main components: corundum and magnetite). Preferable examples of the abrasive agent are chromium oxide and artificial corundum. These abrasive agents having an average particle diameter of 0.05 to 5 $\mu$m are used and abrasive agents having an average particle diameter of 0.1 to 2 $\mu$m is preferred. The abrasive agent can be used in an amount of 0.01 to 10 parts by weight, preferably 0.01 to 5.0 parts by weight per 100 parts by weight of the binder. A detailed description of the abrasive agent is disclosed in Japanese Patent Application No. 26749/1973, U.S. Pat. Nos. 3,007,807, 3,041,196, 3,293,066, 3,630,910, 3,687,725; British Pat. No. 1,145,349; and West German Patent (DT-PS) No. 853,211.

An antistatic agent used in the backing layer includes a natural surface active agent such as saponin; a nonionic surface active agent such as alkylene oxide type, glycerin type or glycidol type; a cationic surface active agent such as a higher alkyl amine, a quaternary ammonium salt, pyridine and other heterocyclic compounds, a phosphonium compound or a sulphonium compound; an anionic surface active agent such as a carboxylic acid, a sulphonic acid, a phosphoric acid, or a compound having an acidic group such as a sulfuric acid ester group or a phosphoric acid ester group; and an amphoteric surface active agent such as a amino acid, a aminosulfonic acid and a sulfuric acid ester or phosphoric acid ester of an amino alcohol. The antistatic agent can be used in amount of 0.01 to 10 parts by weight, preferably 0.01 to 1.0 parts by weight per 100 parts by weight of the binder.

The surface active agents used as an antistatic agent are partially disclosed in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Application (OLS) No. 1,942,665, British Pat. Nos. 1,077,317 and 1,198,450, *Kaimenkasseizai no gohsei to ohyoh (Synthesis of surface active agents and application thereof),* by Ryohei Oda, published by Maki Shoten (Japan) in 1964; *Surface Active Agents* by A.W. Bailey published in 1958 by Interscience Publication Incorporated); *Encyclopedia of Surface Active Agents,* Vol. 2, by T. P. Sisley, published in 1964 by Chemical Publish Company; *Kaimenkasseizai Binran (Manual of surface active agents),* 6th version, published by Sakgyo Tosho Co., Ltd. (Japan) in Dec. 20, 1966 (the term "OLS" used herein means "unexamined published West German Patent Application").

These surface active agents can be used alone or in combination thereof. They are usually used as an antistatic agent but can be also used for improving dispersion and lubricating properties.

The support of the magnetic recording medium of the present invention includes a polyethylene terephthalate film, a polyethylene naphthalate film, a polyamide film, a polyimide film and a vinyl chloride type film. Preferable example thereof is polyethylene terephthalate. Opposite surfaces of the support can have surface smoothness. The support can be subjected to metal evaporation deposition treatment using Al, if necessary. An under layer can be provided under the magnetic layer or under the backing layer. The support can be colored with carbon black, dye and the like.

Methods for preparing a magnetic coating composition used in the present invention are disclosed in detail in Japanese Patent Publication Nos. 15/1960, 26794/1964, 186/1968, 28043/1972, 28045/1972, 28046/1972, 28048/1972, 31445/1972, 11162/1973, 21331/1973, 33683/1973 and U.S.S.R. Pat. No. 308,033. The magnetic coating composition disclosed therein mainly contains ferromagnetic fine particles, a binder and a solvent for coating and additives such as a dispersing agent, a lubricating agent, an abrasive agent and an antistatic agent can further be included in some cases.

Ferromagnetic fine particles used in the present invention include conventionally used ferromagnetic fine particles such as $\gamma$-Fe$_2$O$_3$, Co-containing $\gamma$-Fe$_2$O$_3$, Fe$_3$O$_4$, Co-containing Fe$_3$O$_4$, Bertholide compound of $\gamma$-Fe$_2$O$_3$ and Fe$_3$O$_4$ (FeOx: $1.33<x<1.50$), Berholide compound of Co-containing $\gamma$-Fe$_2$O$_3$ and Fe$_3$O$_4$ (FeOx: $1.33<x<1.50$), CrO$_2$, Co-Ni-P alloy, Co-Ni-Fe alloy, Co-Ni-Fe-B alloy, Fe-Ni-Zn alloy, Fe-Mn-Zn alloy, Fe-Co-Ni-P alloy, Ni-Co alloy, Ferrite of tabular Ba, etc. The ferromagnetic fine particles preferably have a coercive force H$_c$ of 500 to 900 Oe, preferably 600 to 850 Oe, a saturation magnetization $\sigma$s of 70 to 80 emu/g, preferably 75 to 79 emu/g, and a specific surface area determined by BET method S$_{BET}$ of 30 to 55 m$^2$/g, preferably 30 to 50 m$^2$/g. Examples of the ferromagnetic fine particles are more specifically disclosed in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964, 39639/1973, U.S. Pat. Nos. 3,026,215, 3,031,341, 3,100,194, 3,242,005, 3,389,014, British Pat. Nos. 752,659, 782,762, 1,007,323, French Pat. No. 1,107,654, West German Patent Application (OLS) No. 1,281,334. The binder can be used in an amount of 10 to 400 parts by weight, preferably 15 to 200 parts by weight, more preferably 20 to 50 parts by weight per 100 parts by weight of the ferromagnetic particles.

As the binder, the lubricating agent, the abrasive agent and the dispersing agent used in the magnetic layer, those disclosed in Japanese Patent Application (OPI) No. 108804/1977 can be used (the term "OPI" used herein means "unexamined published Japanese Patent Application").

Both the magnetic layer and backing layer are provided on the non-magnetic support after dissolving the magnetic layer and backing layer composition in an organic solvent and coating the coating composition.

The ferromagnetic fine particles, the above-described binders, dispersing agents, lubricating agents, abrasive agents, antistatic agents and solvents are mixed and kneaded to prepare a magnetic coating composition.

Upon mixing and kneading the above compositions, ferromagnetic fine particles and other compositions are simultaneously introduced into a mixing and kneading device or introduced one after another into a mixing and kneading device. For example, the ferromagnetic particles are added into the solvent containing the dispersing agent, mixed and kneaded for a predetermined period and then the rest of additives is added thereto and further mixed and kneaded to prepare the magnetic coating composition.

Various mixing and kneading devices are used for mixing, kneading and dispersing the coating composition, such as, for example, a two-roll mill, a three-roll mill, a ball mill, a pebble mill, a trommel, a sand grinder, a Szegvari Attritor, a high speed impeller dispersing device, a high speed stone mill, a high speed impact mill, a disper, a kneader, a high speed mixer, a homogenizer, or an ultrasonic dispersing device.

The technique for mixing, kneading and dispersing is disclosed in *Paint Flow and Pigment Dispersion* by T. C. Patton, published by John Wiley & Sons, 1964. This technique can be applied to the technique for preparing the backing layer. The technique is also disclosed in U.S. Pat. Nos. 2,581,414 and 2,855,156.

Methods for coating the magnetic layer and the backing layer on the support include an air doctor coating method, a blade coating method, an air knife coating method, a squeeze coating method, a dip coating method, a reverse roll coating method, a transfer roll coating method, a gravure coating method, a kiss coating method, a cast coating method, a spray coating method and other coating methods can also be applied in this invention. Detailed description thereof are disclosed in *Coating Kogaku (Coating Engineering)*, pages 253 to 277, published by Asakura Shoten (Japan) on Mar. 20, 1971.

The organic solvents used for coating the coating compositions include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate or monoethyl ether of glycol acetate; glycol ethers such as ether, glycol dimethyl ether, glycol monoethyl ether or dioxane; tars (aromatic hydrocarbons) such as benzene, toluene or xylene; chlorinated hydrocarbons such as methylene chloride, ethylene chloride, carbon tetrachloride, chloroform, ethylene chlorohydrin or dichlorobenzene.

The magnetic layer thus provided on the support is subjected to magnetic orientation to orient the ferromagnetic particles therein, if desired, and then dried. Further, the magnetic layer is subjected to a surface smoothing treatment, if desired, and is slit to a desired shape to prepare the magnetic recording medium of the present invention.

Magnetic orientation is conducted under alternate current or direct current of about 500 to 2,000 gausses; the drying temperature is about 50° to 100° C.; and the drying time is about 3 to 10 minutes.

Methods for magnetic orientation of the ferromagnetic particles are disclosed, for example, in U.S. Pat. Nos. 1,949,840, 2,796,359, 3,001,891, 3,172,776, 3,416,949, 3,473,960, 3,681,138, Japanese Patent Publication Nos. 3427/1957, 28368/1964, 23624/1965, 23625/1965, 13181/1966, 13043/1973, 3972/1973.

The present invention will be illustrated in more detail by the following Example and Comparative Example, but it should not be limited thereto. In the Example and Comparative Examples, all parts and ratios are by weight.

EXAMPLE AND COMPARATIVE EXAMPLE 1

The following composition was put into a ball mill, mixed, kneaded and dispersed for 48 hours, and then 10 parts of a polyisocyanate compound ("Coronate L-75", a trade name, manufactured by Nippon Polyurethane Co., Ltd.) was added thereto, and the composition was further mixed, kneaded and dispersed for 1 hour. Thereafter the composition was filtrated with a filter having an average pore diameter of 1 μm to prepare a magnetic coating composition.

| | |
|---|---|
| Co-containing $\gamma$-Fe$_2$O$_3$ particles (Specific surface area measured by BET method: 35 m$^2$/g, Hc: 650 Oe) | 100 parts |
| Terpolymer of vinyl chloride, vinyl acetate-maleic anhydride ("MPR-TM", a trade name, manufactured by Nisshin Kagaku Co., Ltd., vinyl chloride:vinyl acetate: maleic anhydride = 86:13:1, degree of polymerization: 400) | 15 parts |
| Nitrocellulose (degree of nitration: 11.8%, M$_n$ = 2.74 × 10$^4$, M$_w$ = 10 × 10$^4$, M$_w$/M$_n$ = 3.65) | 5 parts |
| Polyurethane resin ("Crisvon 6119", a trade name, manufactured by Dainippon Ink and Chemicals, Inc.) | 6 parts |
| Carbon black (average particle size: 20 mμ) | 3 parts |
| Chromium oxide (average particle size: 0.7 μm) | 3 parts |
| Oleic acid | 2 parts |
| Butyl stearate | 1 part |
| Stearic acid | 0.5 part |
| Fatty acid modified silicone | 2 parts |
| Oleinamide | 0.5 part |
| Butyl acetate | 240 parts |
| Methyl ethyl ketone | 120 parts |

The above-described coating composition for a magnetic layer was coated by a reverse roll coating method in a dry thickness of 6 μm, on a polyethylene terephthalate film having a thickness of 20 μm, and then dried. The coating composition for a backing layer having the following composition was mixed, kneaded and dispersed in a ball mill for 70 hours, and then 15 parts of a polyisocyanate compound ("Coronate L-75", a trade name, manufactured by Nippon Polyurethane Co., Ltd.) was added thereto, and the composition was mixed, kneaded and dispersed for additional 1 hour.

Thereafter the composition was filtrated with a filter having an average pore diameter of 3 μm to prepare a coating composition for a backing layer. The coating composition for the backing layer was coated on the above polyethylene terephthalate film on the opposite surface to the magnetic layer in a dry thickness of 2 μm by a reverse roll coating method, and dried.

| | |
|---|---|
| Carbon black | Amounts shown in Table |
| Talc (manufactured by Nippon Talc Co., Ltd., average particle size: 1.2 μm, plate-like shape) | Amounts shown in Table |
| Polyurethane resin ("Nipporan 2304" manufactured by Nippon Polyurethane Co., Ltd.) | 27 parts |
| Saran resin ("F-310", a trade name, manufactured by Asahi Dow Limited.) | 32 parts |
| Oleic acid | 0.5 part |
| Oleinamide | 0.5 part |
| Methyl ethyl ketone | 500 parts |
| Butyl acetate | 100 parts |
| Cyclohexane | 40 parts |

The resulting tape was subjected to super calender roll treatment, and slit to 1 inch to prepare sample tapes. These samples were designated Sample Nos. 1 to 12 for the Example and as Sample Nos. 13 to 25 for the Comparative Example. Characteristics of the sample tapes are shown in Table below.

COMPARATIVE EXAMPLE 2

A magnetic layer was provided on a support in the same manner as that in the Example and a coating composition for a backing layer was prepared in the same manner as that in the Example except that a phenoxy resin ("PKHH", a trade name, manufactured by Union Carbide Co., Ltd.) was used instead of the polyurethane resin in the same amount and then, the same procedure was repeated as in the Example to prepare sample tapes. Characteristics of the sample tapes for Comparative Example 2 are shown as Sample Nos. 26 to 30 in the Table below.

Characteristics of the sample tapes shown in Table 1 were measured and evaluated in the following manner.

(1) Swelling on the backing layer:

After the sample tapes having 10 min. length were played and rewound for 50 passes on a deck, they were checked for deformation of the tapes, i.e., a swelling made by scratches on the backing layer. Evaluation was made on the three basis below.

A: No deformation on the backing layer
B: One or two deformations on the backing layer
C: Three or more deformations on the backing layer (2) Number of dropout:

The number of dropout was measured after sample tapes having 10 min. length were played and rewound for 50 passes on a deck. The number of dropout was counted by a dropout counter for 10 min., when the replayed output level was decreased by 16 dB or more for 5 μsec or more.

(3) RF output (dB)
(4) Color S/N (dB)

Color S/N was measured in accordance with the BTS standard after sample tapes having 10 min. length were played and rewound for 50 passes.

(Standard tape: Video tape having one inch width, trade name "H621", manufactured by Fuji Photo Film Co., Ltd.)

TABLE

| Sample Number | Amount of Carbon Black used for Backing Layer (parts) Average particle size | | | | Talc (wt %*) | Resin used for Backing Layer | | Ratio of Non-Magnetic Particles and Binder Resin | Swelling in Backing Layer | Number of Dropout | RF Output (dB) | Color S/N (dB) |
| | 20 mμ | 40 mμ | 90 mμ | 300 mμ | | Saran Resin | Phenoxy Resin | | | | | |
|---|---|---|---|---|---|---|---|---|---|---|---|---|
| 1 | — | — | 64 | 16 | 20 | o | — | 1/0.735 | A | 70 | 1.1 | 1.9 |
| 2 | — | — | 50 | 12.5 | 37.5 | o | — | " | A | 80 | 1.0 | 2.0 |
| 3 | — | 50 | — | 12.5 | 37.5 | o | — | " | A | 90 | 0.9 | 1.8 |
| 4 | — | — | 25 | 25 | 50 | o | — | " | A | 100 | 0.8 | 1.7 |
| 5 | — | — | 25.5 | 17 | 57.5 | o | — | " | A | 100 | 0.8 | 1.8 |
| 6 | — | — | 24 | 16 | 60 | o | — | " | A | 110 | 0.8 | 1.7 |
| 7 | — | — | 20 | 80 | — | o | — | 1/0.515 | A | 150 | 0.7 | 1.6 |
| 8 | — | — | 37.5 | 62.5 | — | o | — | " | A | 120 | 0.8 | 1.8 |
| 9 | — | — | 50 | 50 | — | o | — | " | A | 100 | 0.9 | 1.9 |
| 10 | — | 50 | — | 50 | — | o | — | " | A | 100 | 0.9 | 1.9 |
| 11 | — | — | 72.5 | 27.5 | — | o | — | " | A | 90 | 1.0 | 2.0 |
| 12 | — | — | 90 | 10 | — | o | — | " | A | 90 | 1.0 | 2.0 |
| 13 | 25 | — | 25 | — | 50 | o | — | 1/0.735 | C | >1000 | 0.6 | −0.2 |
| 14 | 25 | — | — | 25 | 50 | o | — | " | B | 200 | 0.8 | 1.1 |
| 15 | 50 | — | 50 | — | — | o | — | 1/0.515 | C | >1000 | 0.7 | −0.4 |
| 16 | 50 | — | — | 50 | — | o | — | " | C | >1000 | 0.7 | 0 |
| 17 | — | — | 100 | — | — | o | — | " | C | >1000 | 0.6 | −0.1 |
| 18 | — | — | — | 100 | — | o | — | " | A | 850 | 0.4 | −2.0 |
| 19 | — | — | — | — | 100 | o | — | " | C | >1000 | 0.7 | −0.3 |
| 20 | — | — | 64 | 16 | 20 | o | — | 1/1.2 | C | >1000 | 0.7 | −0.4 |
| 21 | — | — | 25 | 25 | 50 | o | — | " | C | >1000 | 0.7 | −0.3 |
| 22 | — | — | 24 | 16 | 60 | o | — | " | C | >1000 | 0.7 | −0.3 |
| 23 | — | — | 64 | 16 | 20 | o | — | 1/0.35 | C | >1000 | 0.8 | −0.1 |
| 24 | — | — | 25 | 25 | 50 | o | — | " | C | >1000 | 0.8 | −0.2 |
| 25 | — | — | 24 | 16 | 60 | o | — | " | C | >1000 | 0.9 | 0 |
| 26 | — | — | 64 | 16 | 20 | — | o | 1/0.735 | C | >1000 | 0.8 | −0.1 |
| 27 | — | — | 50 | 12.5 | 37.5 | — | o | " | C | >1000 | 0.8 | −0.1 |
| 28 | — | 50 | — | 12.5 | 37.5 | — | o | " | C | >1000 | 0.7 | −0.3 |
| 29 | — | — | 25 | 25 | 50 | — | o | " | C | >1000 | 0.8 | −0.2 |

TABLE-continued

| Sample Number | Amount of Carbon Black used for Backing Layer (parts) Average particle size | | | | Talc (wt %*) | Resin used for Backing Layer | | Ratio of Non-Magnetic Particles and Binder Resin | Swelling in Backing Layer | Number of Dropout | RF Output (dB) | Color S/N (dB) |
|---|---|---|---|---|---|---|---|---|---|---|---|---|
| | 20 mμ | 40 mμ | 90 mμ | 300 mμ | | Saran Resin | Phenoxy Resin | | | | | |
| 30 | — | — | 24 | 16 | 60 | — | o | " | C | >1000 | 0.6 | −0.3 | note:
*wt % to the total amount of the non-magnetic particles
Sample Nos. 1 to 12 are Examples of the present invention and Sample Nos. 13 to 30 are Comparative Examples.

It is apparent from the results in the Table that the backing layer containing a urethane resin, a terpolymer of vinylidene chloride and acrylonitrile and a polyisocyanate compound as a binder, fine carbon black having an average particle size of 30 to 150 mμ, coarse carbon black having an average particle size of 160 to 600 mμ and talc as non-magnetic particles in a weight ratio (resin binder:non-magnetic particles) of 0.375:1 to 1:1 has remarkably excellent running durability. Accordingly, the present invention is remarkably effective in reducing the output signal omissions for about 1/10 H (5 μsec), which used to be a vital defect particularly for a high sensitive and high quality magnetic recording tape.

While the invention has been described in detail and with reference to specific embodiments thereof, is will be apparent to one skilled in the art that various changes and modifications can be made therein without departing from the spirit and scope thereof.

What is claimed is:

1. A magnetic recording medium which comprises a non-magnetic support having coated on the opposite surfaces thereof a magnetic layer and a backing layer comprising a binder resin and non-magnetic particles, wherein the binder resin comprises a polyurethane resin, a copolymer of vinylidene chloride and acrylonitrile, and a polyisocyanate compound; the non-magnetic particles comprise fine carbon black having an average particle size of 60 to 120 mμ, coarse carbon black having an average particle size of 160 to 600 mμ and talc; and the mixing weight ratio of the binder resin to the non-magnetic particles being within the range of 0.375:1 to 1:1 by weight, wherein the mixing ratio of the fine carbon black to the coarse carbon black is in the range of from 40:60 to 80:20 by weight and the ratio of the total amount of the polyurethane resin and the copolymer of vinylidene chloride and acrylonitrile to the polyisocyanate compound is in the range of from 80:20 to 70:30 by weight.

2. The magnetic recording medium as claimed in claim 1, wherein the coarse carbon black has an average particle size of from 180 to 500 mμ.

3. The magnetic recording medium as claimed in claim 1, wherein the talc has an average particle size of from 0.1 to 50 μm.

4. The magnetic recording medium as claimed in claim 3, wherein the talc has an average particle size of from 0.1 to 15 μm.

5. The magnetic recording medium as claimed in claim 1, wherein the mixing ratio of the two types of carbon black to the talc is in the range of from 40:60 to 80:20 by weight; the amount of the fine carbon black is at least 20 wt % based on the total amount of the non-magnetic particles; and the amount of the coarse carbon black is at least 10 wt % based on the total amount of the non-magnetic particles.

6. The magnetic recording medium as claimed in claim 5, wherein the mixing ratio of the two types of carbon black to the talc is in the range of from 50:50 to 70:30 by weight.

7. The magnetic recording medium as claimed in claim 1, wherein the ratio of the polyurethane resin to the copolymer of vinylidene chloride and acrylonitrile is in the range of from 30:70 to 60:40 by weight.

8. The magnetic recording medium as claimed in claim 7, wherein the ratio of the polyurethane resin to the copolymer of vinylidene chloride and acrylonitrile is in the range of from 40:60 to 50:50 by weight.

9. The magnetic recording medium as claimed in claim 1, wherein the mixing ratio of the resin binder to the non-magnetic particles is in the range of from 0.8:1 to 0.5:1 by weight.

10. The magnetic recording medium as claimed in claim 9, wherein the mixing ratio of the resin binder to the non-magnetic particles is in the range of from 0.75:1 to 0.65:1 by weight.

* * * * *